United States Patent [19]
Radloff et al.

[11] Patent Number: 5,852,546
[45] Date of Patent: Dec. 22, 1998

[54] COMPUTER WITH AN IMPROVED DISK DRIVE EJECT BUTTON ACTUATION ASSEMBLY

[75] Inventors: Timothy Radloff, Austin, Tex.; Ken Haven, Fremont, Calif.

[73] Assignee: Dell U.S.A., L.P., Round Rock, Tex.

[21] Appl. No.: 789,313

[22] Filed: Jan. 23, 1997

[51] Int. Cl.⁶ .................................. G06F 1/16; H05K 7/14
[52] U.S. Cl. ...................... 361/685; 439/159; 360/137 D
[58] Field of Search .................................... 361/683, 684, 361/685, 754, 798, 753; 439/159; 312/223.2, 223.1; 360/99.02, 99.06, 137, 900; 364/708.1

[56] References Cited

U.S. PATENT DOCUMENTS

| | | | |
|---|---|---|---|
| 5,443,395 | 8/1995 | Wang | 439/159 |
| 5,688,134 | 11/1997 | Hirata | 439/159 |
| 5,751,551 | 5/1998 | Hileman et al. | 361/753 |
| 5,765,933 | 6/1998 | Paul et al. | 312/223.1 |
| 5,768,099 | 6/1998 | Radloff et al. | 361/685 |

*Primary Examiner*—Lynn D. Feild
*Attorney, Agent, or Firm*—Haynes and Boone, L.L.P.

[57] ABSTRACT

A computer in which a disk drive is mounted in the computer chassis. An actuation assembly is provided for actuating the disk drive and includes an arm that engages and actuates the eject button of the disk drive upon movement of the actuation assembly and the arm in a first direction. A button is provided in the cover for the chassis which, when manually pressed, engages the actuation assembly causing movement of the actuation assembly and the arm in the first direction to actuate the eject button. The arm is configured to engage and actuate eject buttons having different sizes and/or at different locations.

20 Claims, 3 Drawing Sheets

COMPUTER WITH AN IMPROVED DISK DRIVE EJECT BUTTON ACTUATION ASSEMBLY

TECHNICAL FIELD

The invention relates generally to the field of computers, and, more particularly, to a computer having a disk drive and an improved assembly for actuating the disk drive.

BACKGROUND

Virtually all types of computers include one or more "floppy" disk drives which are mounted in the computer chassis. These drives include a housing which contains the drive components and an eject button or lever extending outside the drive housing which is activated by the user to eject the floppy disk. Since almost every computer is currently being shipped with a 3.5" floppy disk drive, manufacturers like to embed or integrate the disk drive with in the computer chassis to improve the cosmetics and perceived quality of the computer.

The main drawback to this is that it often restricts the computer manufacturer to one floppy disk drive supplier since the disk drive must meet several, fairly precise, physical characteristics and since a great majority of the drives vary from brand to brand with respect to structural features, dimensions and/or tolerances. For example, the location, shape, and/or size of the eject button for the drive can vary significantly from brand to brand. Therefore, when the manufacturer designs a computer to accommodate a drive from a particular supplier, it is usually difficult to find a drive from another supplier having an eject button that is located precisely in the same location and has the same shape and size. This, of course, is undesirable from a business standpoint since the manufacturer has to depend on only one supplier for its disk drives.

Therefore, what is needed is a disk drive actuating assembly that accommodates different designs of disk drives in which the location of the eject button varies from brand to brand, thus enabling the computer manufacturer to use different designs of disk drives, and therefore different suppliers.

SUMMARY OF THE INVENTION

To this end, according to an embodiment of the present, a disk drive is mounted in the computer chassis and is actuated by an assembly that engages and actuates the eject button of the disk drive upon movement of the actuation assembly and the arm. A button is provided in a cover for the chassis which, when manually pressed, engages the actuation assembly causing movement of the actuation assembly and the arm to actuate the eject button. The arm is designed to actuate disk drives of different designs, and, more particularly, disk drives having eject buttons of different sizes and/or at different locations.

An advantage of the above is that access to the eject button is provided in a manner that is cosmetically pleasing and having the most tolerant functionality, while providing improved ergonomics and enabling the manufacturer to use a number of different designs of disk drives.

DETAILED DESCRIPTION OF THE PREFERRED EMBODIMENT

Figure 1:
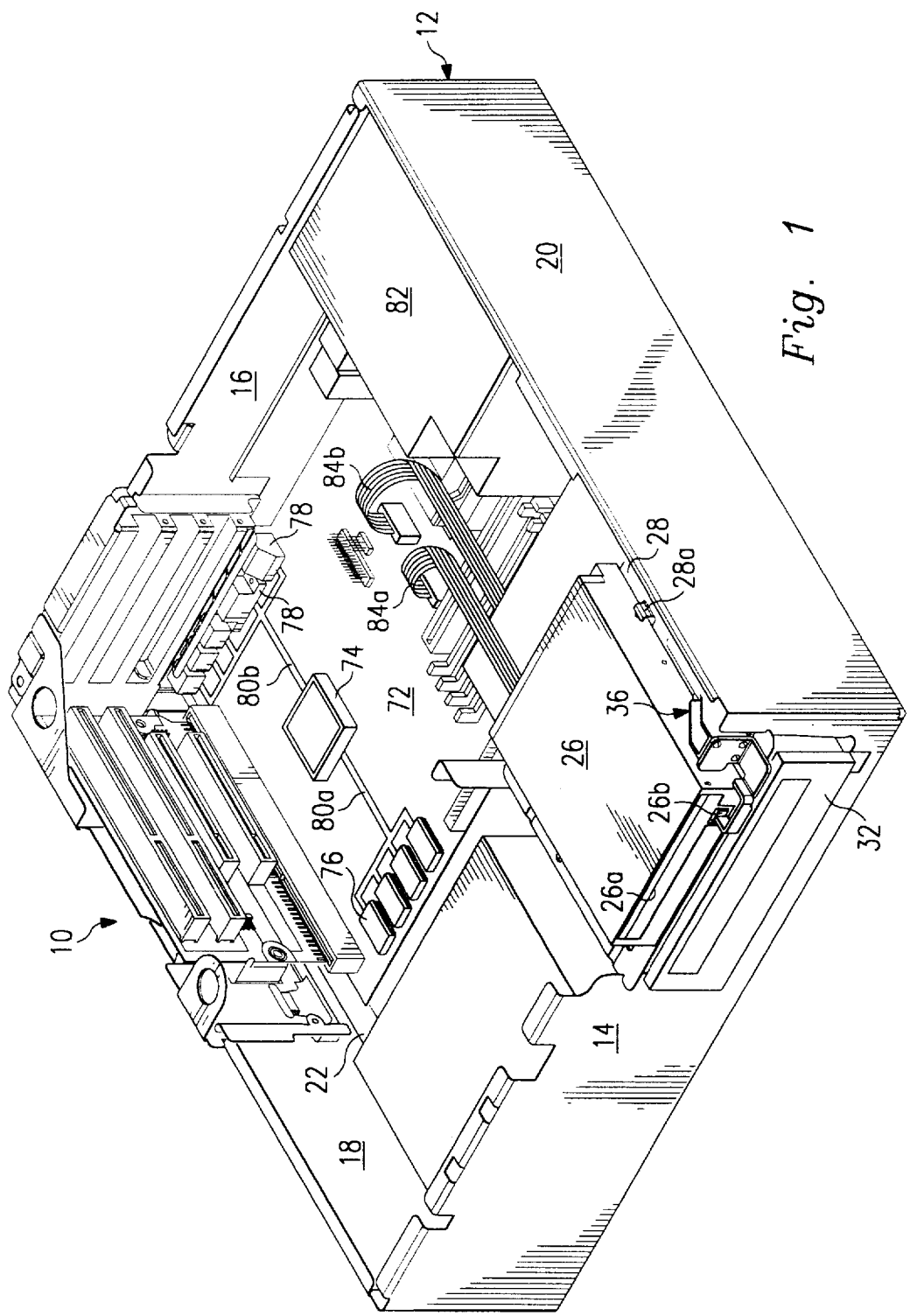
FIG. 1 is an isometric view of the chassis of a computer according to an embodiment of the present invention which contains a disk drive and an improved actuation assembly

Referring to FIG. 1 of the drawing, the reference numeral 10 refers, in general, to an embodiment of a desktop computer according to the present invention. The computer 10 includes a chassis, or inner enclosure, 12 formed by a front wall 14, a rear wall 16, two sidewalls 18 and 20, and a bottom wall, or base, 22. Although not shown in FIG. 1 for the convenience of presentation, it is understood that an outer enclosure extends over the chassis 12 and includes a cover to be described. Preferably, the chassis 12 is fabricated from sheet metal and the outer enclosure from plastic.

A floppy disk drive unit 26 is disposed in the chassis 12 adjacent the front wall 14 and the side wall 20. The drive unit 26 is supported on a support plate 28 and is secured thereto by a plurality of tabs 28a (one of which is shown in FIG. 1) which extend up from the support plate 28 and into slots or openings formed in the sidewall of the drive unit.

The support plate 28, and therefore the drive unit 26, are mounted to the chassis 12 in any known manner. For example, the support plate 28 can rest on a bracket (not shown) which includes vertically-extending walls that extend upwardly from the base 22. In addition, flanges, tabs and the like can be provided on the support plate 28 which engage corresponding portions of the chassis 12 to provide further support of the plate. Since the specific manner in which the drive unit 26 is supported in the chassis 12 does not form any part of the present invention, it will not be described in any further detail.

A slot 26a is provided in the front plate, or face, of the drive unit 26 for permitting the ingress and egress of a floppy disk. An eject button 26b (having its normal plastic topper removed) extends just below the slot 26a near one end thereof for ejecting the disk from the drive unit 26 in a conventional manner. The front plate, or face, of the drive unit 26 extends approximately flush with the front wall 14 of the chassis 12 with the latter wall having a large opening to accommodate the drive unit and to permit access to the slot 26a. The drive unit 26 extends above another drive unit 32 which can be in the form of another, different sized, floppy disk unit, a CD ROM drive unit, or the like.

Figure 2:
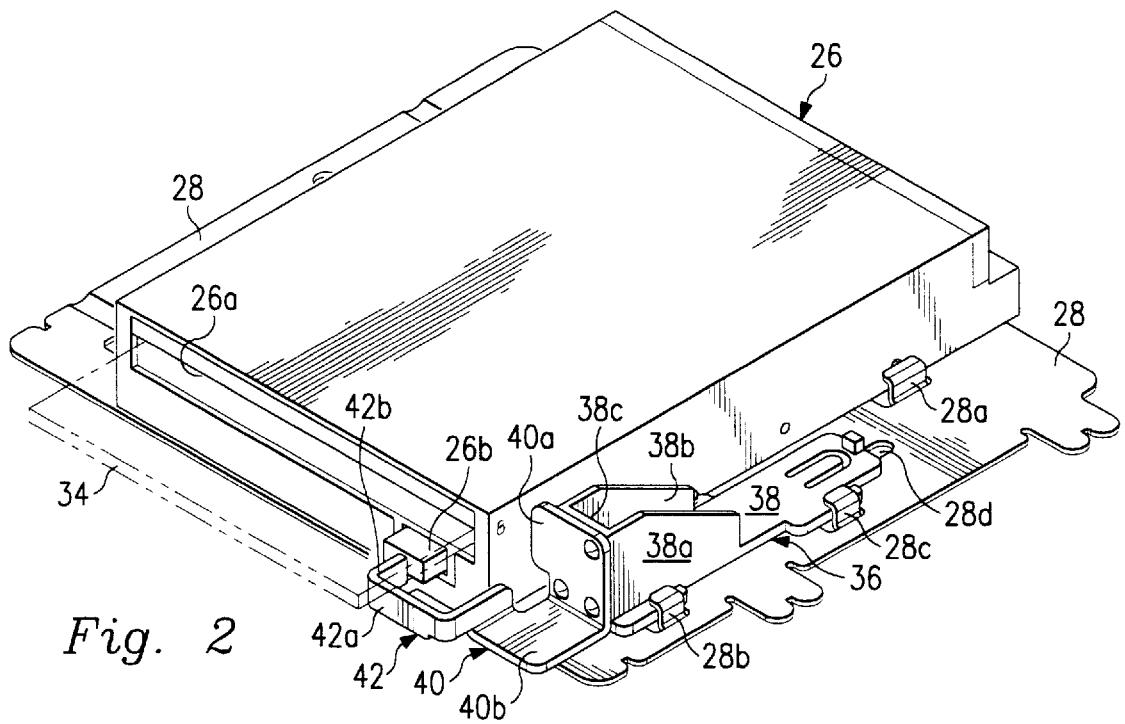
FIG. 2 is an enlarged isometric view of the disk drive and the actuation assembly of FIG. 1.

The drive unit 26 is shown with a floppy disk 34 partially inserted in its slot 26a in FIG. 2. A slider assembly 36 extends adjacent the drive unit, and is better shown in FIG. 2. The slider assembly 36 is mounted on the support plate 28 adjacent one sidewall of the drive unit 26 and includes a slide plate 38 extending parallel to the support plate. The slide plate 38 has two upwardly-extending, spaced tabs 38a and 38b extending from the opposite sides of the slide plate and perpendicular to the slide plate, along with a front tab 38c also extending perpendicular to the slide plate and between the tabs 38a and 38b. The slide plate 38 and the tabs 38a, 38b and 38c are all preferably formed of plastic, in which case the tabs would be molded integrally with the slide plate.

A pair of spaced hooks 28b and 28c are formed on the support plate 28 and each extends over one extended side edge portion of the slide plate 38, it being understood that one or more additional hooks (not shown) are also provided on the support plate which extend over the other side edge portion of the slide plate 38. The hooks 28a and 28b and the additional hooks (not shown) extend over the slide plate 38 in a loose fit and thus permit slidable movement of the slide plate 38 on the support plate 28 in a direction from front-to-rear and rear-to-front as viewed in FIG. 1. The support plate 28 is provided with a slot, the end portion of which is shown by the reference numeral 28d, and a downwardly directed tab (not shown) is provided on the slide plate 38 which extends through the slot, with the length of the slot thus determining the limits of the sidable movement of the slide plate.

Figure 3:
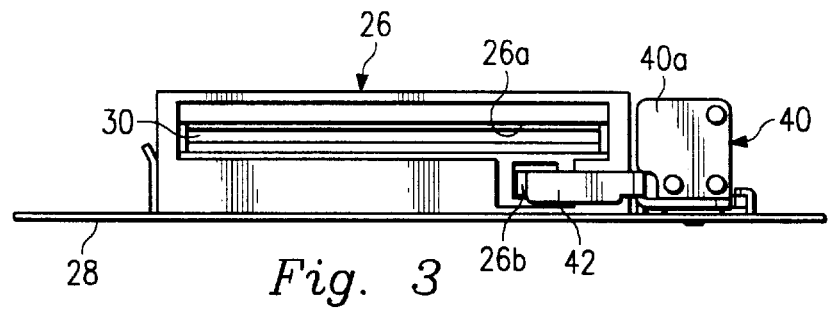
FIG. 3 is a front elevational view of the disk drive and the actuation assembly of FIG. 2.

As shown in FIGS. 2 and 3, an L-shaped plate 40 is provided which has one leg portion 40a fastened to the front tab 38c of the slider assembly 36 in any known manner such as by heat-staking, or the like. The other leg portion 40b of the plate 40 extends parallel to the slide plate 38 and an actuating arm 42 extends from the leg portion 40b. The arm 42 is U-shaped and includes a base portion 42a and a leg portion 42b that extends at right angles to the base portion and engages the eject button 26b of the drive unit 26 for the purpose of actuating same, as will be described. Preferably the arm 42 and the plate 40 are formed integrally from relatively thick sheet metal.

Figure 4:
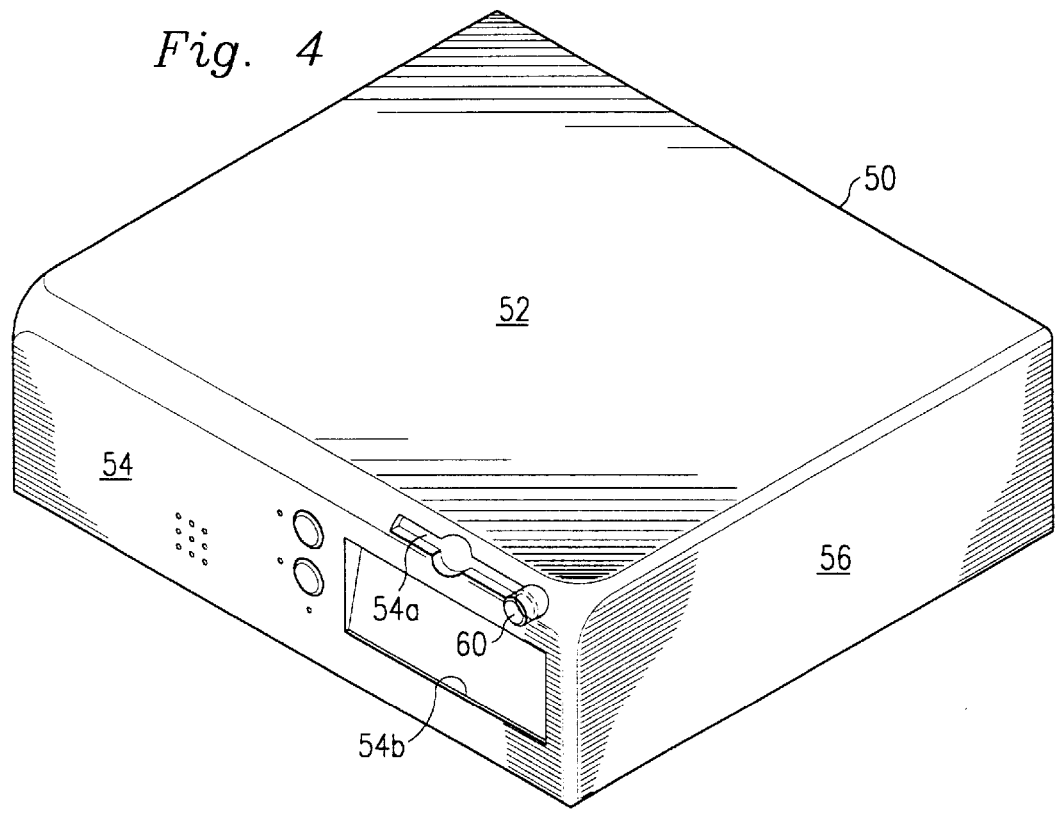
FIG. 4 is an isometric view of a cover for the chassis of FIG. 1

Referring to FIG. 4, a cover 50 is provided for the chassis 12 and includes a top plate 52, a front wall 54 and two sidewalls, one of which is shown by the reference numeral 56. An elongated slot 54a is provided through the front wall 54 which registers with the slot 26a of the drive unit 26 for permitting ingress and egress of the disk 34 (FIG. 2). An opening 54b also extends through the front wall 54 of the cover 50 for receiving the other drive unit 32. An eject button 60 is provided at one end of the elongated opening 54a and is adapted to actuate the eject button 26b of the drive unit 26 through the slider assembly 36 in a manner to be described.

Figure 5:
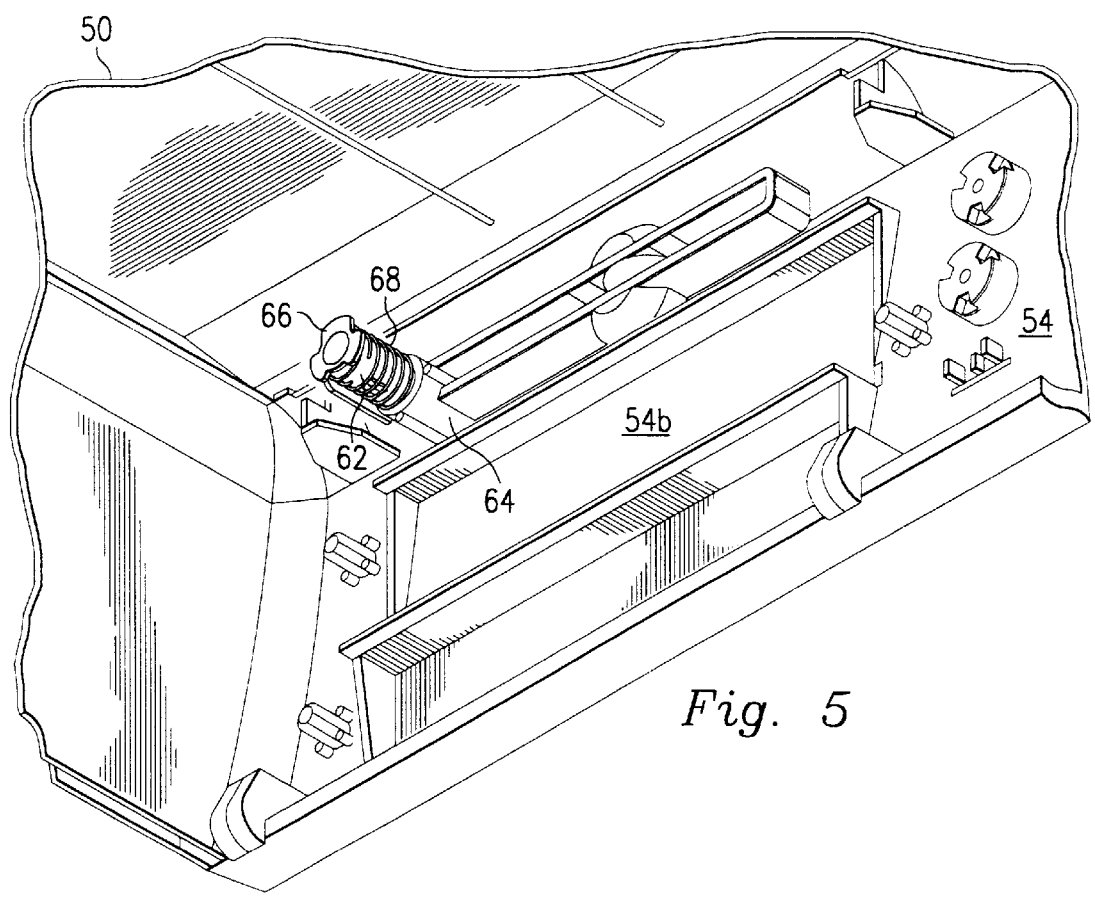
FIG. 5 is an enlarged isometric view of an inner portion of the cover of FIG. 4.

With reference to FIG. 5, a shaft 62 is mounted for slidable movement in a boss 64 formed on the inner surface of the wall 54. The shaft 62 also extends through an opening (not shown) provided in the front wall 54 of the cover 50 and the button 60 (FIG. 4) is formed on one end of the shaft such as by rounding off the end of the shaft, or the like. A retainer, or cap, 66 (FIG. 5) is attached to the other end of the shaft 62 inside the cover 50. A helical spring 68 extends around the shaft 62 and is trapped between the cap 66 and the distal end of the boss 64. The spring 68 is designed to apply a relatively light force to the cap 66 to urge the cap 66 in a direction from right-to-left as viewed in FIG. 5. This, in turn, urges the button 60 inwardly, as viewed in FIG. 4 to its normal rest position shown by the dashed lines.

Although not clear from the drawing, it is understood that, when the cover 50 is placed over the chassis 12, the spring 68 urges the cap 66 at the end of the shaft 62 into engagement with the leg portion 40a of the L-shaped plate 40 (FIGS. 2 and 3) of the slider assembly 36.

When a floppy disk 34 (FIG. 2) is inserted through the slot 26a and into the drive unit 26, a mechanism (not shown) associated with the eject button 26b of the drive unit 26 forces the eject button 26b outwardly a predetermined distance. This causes corresponding outward movement of the arm portion 42b, and therefore the plate 40a of the slider assembly 36, with a force that overcomes the relatively light force of the spring 68, thus forcing the button 60 outwardly from its rest position to its extended position shown by the solid lines in FIG. 4.

After the disk 34 has been used, it is ejected from the drive unit 26 by pushing the button 60 from its extended position inwardly relative to the cover 50 against the force of the eject button mechanism discussed above. The cap 66 thus pushes inwardly against the leg portion 40a of the plate 40 of the slider assembly 36. This, in turn, causes slidable movement of the slider assembly 36, including the arm 42, in a rearwardly direction as viewed in FIG. 2. The arm portion 42b is thus forced against the eject button 26b of the drive mechanism of the drive unit 26 and depresses the latter button. This causes the ejection of the disk 34 from the drive mechanism of the drive unit 26 in a conventional manner to the position shown in FIG. 2, i.e., with a portion of the disk extending out from the slot 26a. After the disc 34 is ejected and the button 60 released, the spring 68 returns the button to its normal rest position shown by the dashed lines in FIG. 4.

Figure 6:
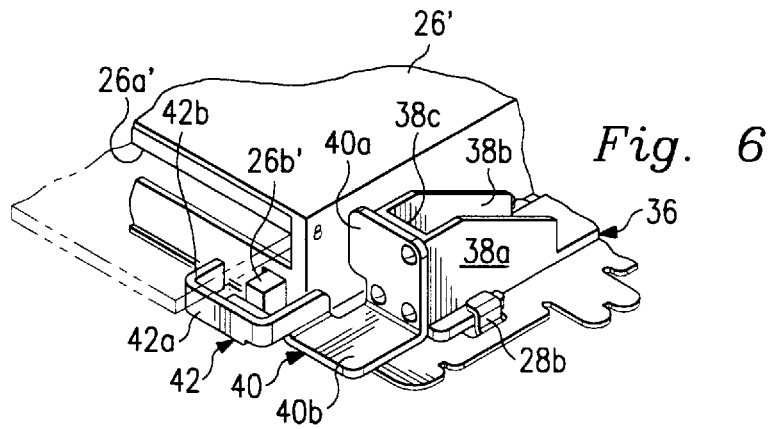
FIG. 6 is a partial view, similar to that of FIG. 2, but depicting the actuation assembly of FIGS. 1–3 in use with another disk drive.

According to a feature of the present invention, the slider assembly 36 can accommodate another drive unit having an eject button that is of a different shape, size and/or in a different location on its front plate when compared to the location of the button 26b of the drive unit 26. For the purpose of example, a drive unit 26' is shown in FIG. 6 that has a slot 26a' and an eject button 26b' that is n a different location when compared to the eject button 26b of the drive unit 26. More specifically, the eject button 26b' is located to the right of the arm portion 42b as viewed in FIG. 6. Also, in its rest position shown in FIG. 6, the eject button 26b' extends further out from the slot 26a' than the button 26b extended from the slot 26a. However, as noted from FIG. 6, this is accommodated by the arm 42 since the eject button 26b' engages the base portion 42a of the arm 42. Thus, the actuation and ejection of the disk from the drive unit 26' is identical to that described in connection with the drive unit 26.

It is also under stood that, in the event the eject button of a particular drive unit is located a significant distance to the left of the arm portion 42b as viewed in FIG. 5, the plate 40 and the arm 42 can be replaced by another plate and arm (not shown) with the length of the base portion 42a of the latter arm corresponding to latter distance so that the arm portion 42b will engage the eject button. This replacement of the plate 40 and the arm 42, of course, can be made easily and quickly by the computer manufacturer. Of course, the length of the arm portion 42b can also be varied to accommodate variances in the length of projection of the eject buttons or eject buttons with different eject stroke or pressure characteristics.

Referring again to FIG. 1 the computer 10 includes other components disposed in the chassis 12 including a motherboard 72 resting on the bottom plate 22. A processor 74, a plurality of memory devices or modules 76, and five input/output (I/O) devices 78 are mounted on the motherboard 72, and two buses 80a and 80b are also provided on the motherboard 72 that connect the processor 74 to the memory modules 76 and to the input/output devices 78, respectively. A power supply 82 is connected to the mother board 72 and a pair of cable assemblies 84a and 84b respectively connect the drive unit 26 and a the drive unit 32 to the motherboard 72. It is understood that other components, electrical traces, electrical circuits and related devices (not shown) are provided in the chassis 12. Since these are all conventional, they will not be described in any further detail.

The present invention thus enjoys several advantages. For example, it provides access to the eject button for the user in a way that is cosmetically pleasing and the most tolerant functionality. Also, the assembly of the present invention provides improved ergonomics and enables the manufacturer to use a number of different designs of disk drives having eject buttons at different locations. Also, the slider assembly 36 can be made of plastic and therefore is relatively quiet in operation.

It is understood that other variations may be made in the foregoing without departing from the scope of the invention. For example, the present invention is not limited to use with a computer as described above by means of example, but is equally applicable for actuating any component within the scope of the present invention.

It is also understood that the embodiment of the assembly of the present invention described above is intended to illustrate rather than limit the invention, and that the mounting assembly can take many other forms and embodiments within the scope of the invention.

What is claimed is:

1. A computer comprising a chassis, a processor disposed in the chassis, a memory device disposed in the chassis, a disk drive unit disposed in the chassis and having an eject button, a first actuation member disposed in the chassis, moveable relative to the disk drive, and having an arm extending therefrom and moveable therewith, the arm adapted to engage and actuate the eject button upon movement of the first actuation member in a first direction, a cover extending over the chassis, and a second actuation member supported by the cover and engaging the first actuation member so that manual movement of the second actuation member in the first direction causes corresponding movement of the first actuation member and the arm in the first direction and actuation of the eject button.

2. The computer of claim 1 wherein the arm has a base portion and a leg portion extending at a right angle to the base portion, so that the base portion and the leg portion can respectively engage eject buttons at different locations relative to the second actuating member.

3. The computer of claim 1 wherein the base portion and the leg portion of the arm can respectively engage eject buttons that protrude different distances from the drive unit.

4. The computer of claim 1 wherein the arm is connected to the first actuation member and can be replaced to accommodate another disk drive having an eject button located in a position different from that of the first-mentioned eject button.

5. The computer of claim 1 wherein the first actuation member is disposed adjacent the disk drive unit and slides relative to the disk drive unit in the first direction.

6. The computer of claim 5 further comprising a support plate on which the disk drive unit is mounted, the first actuation member being supported on the support plate for slidable movement.

7. The computer of claim 1 further comprising a spring for biasing the second actuation member in the first direction towards the first actuation member.

8. The computer of claim 1 wherein the second actuation member is in the form of a shaft having a button formed at one end thereof and extending outwardly from the cover, and a spring mounted relative to the cover and engaging the shaft to return the second actuation member to a rest position after the manual movement.

9. An assembly for actuating a disk drive unit having an eject button, the assembly comprising a slidable member moveable relative to the disk drive and an arm extending from the slidable member and moveable therewith, the arm adapted to engage and actuate the eject button upon movement of the sidable member in a first direction, the arm having a base portion and a leg portion extending at a right angle to the base portion, so that the base portion and the leg portion can respectively engage eject buttons at different locations relative to the slidable member.

10. The assembly of claim 9 wherein the base portion and the leg portion of the arm can respectively engage eject buttons that protrude different distances from the drive unit.

11. The assembly of claim 11 wherein the arm is connected to the slidable member and can be replaced with an arm having a base portion and/or a leg portion of a different length to accommodate another disk drive having an eject button that is located in a different position than that of the first-mentioned eject button and/or protrudes a different distance from the drive unit than the first-mentioned eject button.

12. An assembly for actuating a disk drive unit having an eject button, the assembly comprising a sidable member moveable relative to the disk drive and an arm extending from the slidable member and moveable therewith, the arm adapted to engage and actuate the eject button upon movement of the sidable member in a first direction, the arm having a base portion and a leg portion extending at a right angle to the base portion, so that the base portion and the leg portion can respectively engage eject buttons that protrude different distances from the drive unit.

13. The assembly of claim 12 wherein the arm is connected to the slidable member and can be replaced with an arm having a base portion and/or a leg portion of a different length to accommodate another disk drive having an eject button that is located in a different position than that of the first-mentioned eject button and/or protrudes a different distance from the drive unit than the first-mentioned eject button.

14. An assembly for actuating a disk drive unit having an eject button, the assembly comprising a slidable member moveable relative to the disk drive and an arm detachably connected to, and extending from, the slidable member and moveable therewith, the arm having a length corresponding to the portion of the eject button relative to the slidable member so that it engages and actuates the eject button upon movement of the slidable member in a first direction, where the arm can be replaced with another arm having a base portion and/or a leg portion of a different length to accommodate another disk drive having an eject button that is located in a different position than that of the first-mentioned eject button and/or protrudes a different distance from the drive unit than the first-mentioned eject button.

15. A method of actuating a disk in a computer chassis, comprising the steps of providing an actuation assembly in the chassis including an arm that engages and actuates the eject button of the disk drive upon movement of the actuation assembly and the arm in a first direction, placing a cover over the chassis having a button which, when manually pressed, engages the actuation assembly causing movement of the actuation assembly and the arm in the first direction to actuate the eject button.

16. An assembly for actuating a disk drive having a eject button disposed in a chassis, the assembly comprising an actuation member disposed in the chassis and moveable relative to the disk drive, and an arm extending from the actuation member and moveable therewith, the arm adapted to engage and actuate the eject button of the disk drive upon movement of the actuation member in a first direction, the actuation member being located in the chassis so that engagement of a button disposed in a cover extending over the chassis causes corresponding movement of the first actuation member and the arm in the first direction and actuation of the eject button.

17. The assembly of claim 16 wherein the actuation member is disposed adjacent the disk drive and slides relative to the disk drive in the first direction.

18. The assembly of claim 16 further comprising a support plate on which the disk drive is mounted, the actuation member being supported on the support plate for slidable movement.

19. The assembly of claim 16 wherein the eject button is biased in a direction opposite the first direction so that, upon release of the second actuation member, the eject button, the arm and the actuation member move in the opposite direction.

20. The assembly of claim 16 wherein the arm is connected to the actuation member and can be replaced to accommodate another disk drive having an eject button located in a position different from that of the first-mentioned eject button.

\* \* \* \* \*